United States Patent [19]

Gagin

[11] 4,118,239

[45] Oct. 3, 1978

[54] ALKALI-RESISTANT GLASS FIBER COMPOSITION

[75] Inventor: Lawrence Vincent Gagin, Littleton, Colo.

[73] Assignee: Johns-Manville Corporation, Denver, Colo.

[21] Appl. No.: 830,549

[22] Filed: Sep. 6, 1977

[51] Int. Cl.$^2$ .................. C03C 13/00; C03C 3/04; C04B 31/06
[52] U.S. Cl. ............................ 106/50; 106/52; 106/54; 106/99
[58] Field of Search ................ 106/50, 52, 99, 54

[56] References Cited

U.S. PATENT DOCUMENTS

| | | | |
|---|---|---|---|
| 2,877,124 | 3/1959 | Welsch | 106/50 X |
| 3,783,092 | 1/1974 | Majumdar | 106/50 X |
| 3,794,505 | 2/1974 | Helser et al. | 106/120 |
| 3,861,926 | 1/1975 | Irlam et al. | 106/50 |
| 3,969,121 | 7/1976 | Atkinson | 106/50 |
| 4,014,705 | 3/1977 | Yale | 106/50 |
| 4,062,689 | 12/1977 | Suzuki et al. | 106/99 |
| 4,065,317 | 12/1977 | Baak et al. | 106/52 |

*Primary Examiner*—Helen M. McCarthy
*Attorney, Agent, or Firm*—Robert M. Krone; Joseph J. Kelly; James W. McClain

[57] ABSTRACT

An alkali-resistant fiberizable glass composition is disclosed, comprising, in parts by weight, $SiO_2$, 50-60 parts; $Al_2O_3$, 1-11 parts; $ZrO_2$, 4-10 parts; ZnO, 0.5-7 parts; at least one Group IA oxide, 10-19 parts; and at least one Group IIA oxide, 3-15 parts. Glass fiber of this composition is also disclosed, as is a Portland cement matrix reinforced with a plurality of such fibers.

7 Claims, No Drawings

ALKALI-RESISTANT GLASS FIBER COMPOSITION

BACKGROUND OF THE INVENTION

The invention herein relates to alkali-resistant glass fiber compositions. More particularly it relates to such glass fiber compositions which are resistant to corrosive attack in an alkaline environment such as Portland cement.

For some years researchers have been working on glass compositions which could be made into fibers and the fibers in turn used as reinforcement in alkaline environments, notably Portland cement. A variety of different types of compositions have been suggested in patents and articles for use as alkali-resistant glass fibers. Most, however, have not proven to be practical because they have been difficult compositions to fiberize or have sacrificed other desirable properties for alkali resistance. Those which have become commercial have generally been compositions which have been high in the content of zirconia or other costly components. Among the more widely known compositions are those described in U.S. Pat. Nos. 3,783,092; 3,887,386 and 3,901,720, and British Patents Nos. 1,200,732 and 1,243,972 in the name of A. J. Majumdar.

It would definitely be advantageous to provide an alkali-resistant glass composition which could be readily fiberized and which would not require the use of large amounts of expensive materials such as zirconia.

BRIEF SUMMARY OF THE INVENTION

The invention herein comprises an alkali-resistant glass composition capable of being fiberized, which comprises, in parts by weight: silica, 50–62 parts; alumina, 1–11 parts; zirconia, 4–10 parts; zinc oxide, 0.5–7 parts; at least one Group IA metal oxide, 10–19 parts; and at least one Group IIA metal oxide, 3–15 parts. In a preferred embodiment the composition also contains 1–4 parts by weight of fluorine calculated as calcium fluoride (fluorspar). In another embodiment the composition may also contain 3–8 parts by weight of boron oxide.

DETAILED DESCRIPTION AND PREFERRED EMBODIMENTS

The glass fiber of the present invention comprises the following composition, in parts by weight:

| | |
|---|---|
| $SiO_2$ | 50–62 parts |
| $Al_2O_3$ | 1–11 parts |
| $ZrO_2$ | 4–10 parts |
| ZnO | 0.5–7 parts |
| Group IA metal oxide | 10–19 parts |
| Group IIA metal oxide | 3–15 parts |

Each of these components may be in the form of raw materials as normally used in glass manufacture. Each may be incorporated into the glass composition by conventional melting and fining procedures of glass manufacture. The resulting melt composition is then fiberized in the form of continuous filaments generally having dimensions in the range of from about 8 μm to about 20 μm. The continuous strand is then chopped into fibers having individual lengths of from about ¼ inch (6 mm) up to about 2 inches (50 mm). It is also possible to fiberize this composition in the form of alkali-resistant wool fibers which are attenuated from melts by blowing or spinning.

The Group I metal oxides may be any of soda, potassia or lithia, or mixtures thereof, although normally soda is by far the predominant Group I metal oxide with substantially less amounts of potassia and generally little or no lithia. The Group II metal oxides may be lime, magnesia or baria or mixtures thereof. Normally lime will be the predominant component with significantly smaller amounts of magnesia and/or baria. In the case of both the Group IA and Group IIA metal oxides the predominance of soda and lime respectively is based largely on economics and availability and is not particularly critical. In addition, both lime and soda impart better melting and final viscosity properties to the glass than do the other oxides of their respective groups.

In a preferred embodiment the composition also comprises 1–4 parts by weight of fluorine calculated as calcium fluoride (fluorspar). The composition may also contain boron oxide as a fluxing agent in an amount of 3–8 parts by weight. Since the various oxides are incorporated into the composition in the form of mineral raw materials rather than as purified oxides, there will also normally be small amounts of impurity materials present. These may include such things as iron oxides. Normally such impurities will amount to less than about 1 part by weight of the composition.

A number of compositions of the present invention are illustrated below in Table I. Component amounts are shown in parts by weight. Their alkali-resistant properties are compared to a standard type of non-alkali-resistant glass fiber known as "E glass." Durability is determined on the basis of percent weight loss for a 10 micron diameter fiber after one hour of boiling in a 0.1 N aqueous solution of sodium hydroxide. Also included for comparison purposes are data on the chemical durability of 10 micron fibers boiled for 1 hour in 1 N sulfuric acid and in water.

TABLE I

| Component | A | B | C | D | E | F | G | H | "E Glass" |
|---|---|---|---|---|---|---|---|---|---|
| $SiO_2$ | 50.0 | 57.0 | 60.0 | 57.0 | 60.0 | 57.0 | 57.0 | 57.0 | 54.6 |
| $Al_2O_3$ | 6.1 | 6.1 | 6.1 | 6.1 | 6.1 | 6.1 | 8.1 | 6.1 | 14.0 |
| $ZrO_2$ | 9.0 | 7.0 | 4.0 | 4.0 | 7.0 | 7.0 | 7.0 | 7. | — |
| ZnO | 6.0 | 4.0 | 4.0 | 4.0 | 4.0 | 1.0 | 2.0 | 4.0 | — |
| Group IA: | | | | | | | | | |
| $Na_2O$ | 10.0 | 13.9 | 13.9 | 13.9 | 13.9 | 13.9 | 14.2 | 15.9 | 0.2 |
| $K_2O$ | 1.3 | 1.3 | 1.3 | 1.3 | 1.3 | 1.3 | 1.5 | 1.3 | 0.2 |
| Group IIA: | | | | | | | | | |
| CaO | 6.9 | 6.9 | 6.9 | 6.9 | 3.9 | 6.9 | 6.9 | 6.9 | 17.5 |
| MgO | 0.2 | 0.2 | 0.2 | 0.2 | 0.2 | 0.2 | 0.2 | 0.2 | 5.0 |
| BaO | 2.0 | — | — | — | — | — | — | — | — |
| Other: | | | | | | | | | |
| $B_2O_3$ | 5.0 | — | — | 3.0 | — | 3.0 | — | — | 8.0 |
| $CaF_2$ | 3.5 | 3.5 | 3.5 | 3.5 | 3.5 | 3.5 | 3.0 | 1.5 | 0.4 |

TABLE I-continued

| Reagent | Weight Loss % | | | | | | | | |
|---|---|---|---|---|---|---|---|---|---|
| 0.1 N NaOH | 0.56 | 0.33 | 0.93 | 0.92 | 0.66 | 1.13 | 0.92 | 1.07 | 4.23 |
| 1N H$_2$SO$_4$ | 8.24 | 1.48 | 0.77 | 1.22 | 0.62 | 1.05 | 1.08 | 0.84 | 50.00 |
| Water | 0.36 | 0.52 | 0.70 | 0.59 | 0.59 | 0.80 | 0.77 | 0.70 | 0.80 |

In another comparison test 14 um diameter glass fiber of the composition shown in Table II was compared to fibers of both "E glass" and a commercial alkali resistant ("AR") glass which is believed to be a high zirconia content glass of the type generally described in the Majumdar patents cited above. In each test the fibers were boiled for one hour in each of the stated reagents. The results are shown in Table III.

TABLE II

| | |
|---|---|
| SiO$_2$ | 61.2 parts |
| Al$_2$O$_3$ | 5.3 parts |
| ZrO$_2$ | 8.5 parts |
| ZnO | 2.8 parts |
| Group IA: | |
| Na$_2$O | 14.7 parts |
| K$_2$O | 1.0 parts |
| Group IIA: | |
| CaO | 5.1 parts |
| MgO | 0.1 parts |
| Other: | |
| CaF$_2$ | 1.5 parts |

TABLE III

| | Weight Loss, % | | |
|---|---|---|---|
| Reagent | Glass of Table II | "E Glass" | Commercial "AR" Glass |
| 0.1 N NaOH | 0.1 | 3.0 | 0.2 |
| 1 N H$_2$SO$_4$ | 0.4 | 34.2 | 0.4 |
| Water | 0.3 | 0.8 | 0.2 |

It will be immediately evident that the composition of the present invention is the equal of the commercial high zirconia glass in all respects of chemical durability. It will also be evident that it is superior in alkali resistance and acid resistance to the conventional "E glass" fibers.

These tests also indicate that the fibers of the composition of the present invention will be substantially equivalent to present commercial high zirconia glass fibers for concrete reinforcement, since alkali tests of the type described above have been found to have a significant correlation with performance of fibers in the alkaline environment of concrete.

What is claimed is:

1. An alkali-resistant glass composition capable of being fiberized, which consists of, in a total of 100 parts by weight.

| | |
|---|---|
| SiO$_2$ | 50–62 parts |
| Al$_2$O$_3$ | 1–11 parts |
| ZrO$_2$ | 4–10 parts |
| ZnO | 0.5–7 parts |
| Group IA metal oxide | 10–19 parts |
| Group IIA metal oxide | 3–15 parts |

Fluorine calculated as calcium fluoride 1–4 parts.

2. A glass composition as in claim 1 also consisting of 3–8 parts by weight of boron oxide.

3. A glass composition as in claim 1 which consists of, in parts by weight:

| | |
|---|---|
| SiO$_2$ | 61.2 parts |
| Al$_2$O$_3$ | 5.3 parts |
| ZrO$_2$ | 8.5 parts |
| ZnO | 2.8 parts |
| CaO | 5.1 parts |
| MgO | 0.1 parts |
| Na$_2$O | 14.7 parts |
| K$_2$O | 1.0 parts |
| CaF$_2$ | 1.5 parts |

4. Glass fiber formed of a composition as in claim 1.
5. Glass fiber formed of a composition as in claim 3.
6. A Portland cement matrix reinforced by a plurality of fibers having a composition as in claim 1.
7. A Portland cement matrix reinforced by a plurality of fibers having a composition as in claim 3.

* * * * *